United States Patent [19]
Bailey et al.

[11] Patent Number: 5,911,965
[45] Date of Patent: Jun. 15, 1999

[54] PROCESS FOR PRODUCING TUNGSTEN OXIDE

[75] Inventors: John A. Bailey, Bloomington; Kenton D. Budd; Tai T. Tran, both of Woodbury, all of Minn.

[73] Assignee: Minnesota Mining and Manufacturing Company, St. Paul, Minn.

[21] Appl. No.: 09/012,540

[22] Filed: Jan. 23, 1998

Related U.S. Application Data

[63] Continuation of application No. 08/639,020, Apr. 24, 1996.

[51] Int. Cl.$^6$ .......................... G01G 41/00; G01G 41/02; B05D 1/36
[52] U.S. Cl. .......................... 423/606; 423/598; 423/606; 252/309; 427/419.2
[58] Field of Search ................................... 423/606, 598; 252/309; 427/419.2

[56] References Cited

U.S. PATENT DOCUMENTS

| | | |
|---|---|---|
| 3,428,415 | 2/1969 | Chiola et al. . |
| 3,859,373 | 1/1975 | Seitzer ..................................... 423/657 |
| 4,339,424 | 7/1982 | Jacobson et al. ........................ 423/606 |
| 4,347,265 | 8/1982 | Washo . |
| 4,634,585 | 1/1987 | Kudo et al. . |
| 4,753,916 | 6/1988 | Carcia et al. ............................ 502/321 |
| 4,855,161 | 8/1989 | Moser et al. . |
| 4,996,083 | 2/1991 | Moser et al. . |
| 5,035,478 | 7/1991 | Ishikawa et al. . |
| 5,061,599 | 10/1991 | Kudo et al. . |
| 5,252,354 | 10/1993 | Cronin et al. . |
| 5,457,218 | 10/1995 | Cronin et al. . |
| 5,772,978 | 7/1998 | Bailey et al. ............................ 423/606 |

FOREIGN PATENT DOCUMENTS

| | | |
|---|---|---|
| 2 123 459 | 9/1995 | Canada . |
| 2 527 219 | 11/1983 | France . |
| 06 130426 | 5/1994 | Japan . |

OTHER PUBLICATIONS

Chemical Abstracts, vol. 123, No. 12, 18 Sep. 1995, Abstract No. 155196, "Preparation of electrochromic WO3 thin films from condenses tungstate".

Zeitschrift Fur Anorganische Und Allgemeine Chemie, vol. 209, 1932, pp. 188–193.

Solid State Ionics, vol. 84, Apr. 1996, Amsterdam, pp. 205–211, J. Livage et al., "Aqueous precursors for electrochromic tungsten oxide hydrates".

Agrawal et al., Review of solid state electrochromic coatings produced using solgel techniques; Solar Energy Materials and Solar Cells, 31:9–21 (1993).

Judeinstein et al., Electrochromic Properties of Sol–Gel Derived $WO_3$ Coatings; *SPIE 1328:344–51 (1990)*.

Yamanaka et al., Peroxotungstic Acid Coated Films for Electrochromic Display Devices; Jap J. Appl. Phys. 25 (a):1420 (Sep. 1986).

Kudo et al., Coloration Dynamics of Spin–Coated $WO_3nH_2O$ Electrochromic Films from Peroxo–Polytungstate Solution; Kenki Kagaku, 59(8):718–19 (Apr. 1991).

Chemseddine et al., Sol–gel derived electrochromic layers; Revue De Chimie Minerale, 21:487–95 (1984).

OCLI Commercial Literature (1991).

Bell et al., Optical Materials Technology for Energy Efficiency and Solar Energy Conversion X; SPIE 1536:29 (Jul. 1991).

Gottsche et al., Optical Materials Technology for Energy Efficiency and Solar Energy Conversion XI: Chromogenics for Smart Windows; SPIE 1728:13 (May 1992).

Chemseddine et al., Electrochromism of Colloidal Tungsten Oxide; Solid State Ionics, 9/10:357 (1983).

*Primary Examiner*—Gary P. Straub
*Assistant Examiner*—Cam N. Nguyen
*Attorney, Agent, or Firm*—Scott A. Bardell

[57] ABSTRACT

A process for producing a tungsten oxide precursor solution that includes converting a peroxypolytungstate solution to a stable oxide polytungstate solution. The precursor solution may subsequently be transformed to tungsten oxide having electrochromic properties.

34 Claims, No Drawings

PROCESS FOR PRODUCING TUNGSTEN OXIDE

This is a continuation of application Ser. No. 08/639,020 filed Apr. 24, 1996.

This invention was made with government support under Cooperative Agreement No. 70NANB3H1377, awarded by the National Institute of Standards and Technology of the Department of Commerce. The United States Government has certain rights in the invention.

BACKGROUND OF THE INVENTION

This invention relates to producing tungsten oxide.

Tungsten oxide ($WO_3$) is an electrochromic material which has been widely used as the basis for electrochromic-based devices such as displays and light modulating windows. Numerous methods are known for depositing tungsten oxide coatings onto a substrate. Vacuum deposition methods such as sputtering and evaporation are the most commonly used processes, although solution deposition methods are known as well. These solution-based methods generally involve one of three general types of tungsten oxide precursors: colloidal sols, alkoxide derivatives, and peroxy tungstic acid.

While the above-described methods generally produce acceptable tungsten oxide coatings, they often are sensitive to numerous process conditions, thereby limiting reproducibility and increasing overall expense.

SUMMARY OF THE INVENTION

In a first aspect, the invention features a process for producing a tungsten oxide precursor solution in which a peroxypolytungstate solution is converted to a stable oxide polytungstate solution.

In preferred embodiments, the process includes the step of treating a polytungstate solution (e.g., an acidified ammonium metatungstate solution) with a peroxide (e.g., hydrogen peroxide) to form the peroxypolytungstate solution. The amount of peroxide preferably ranges from about 0.2 to about 2.0 moles of hydrogen peroxide per mole of tungsten, more preferably from about 0.7 to about 1.3 moles of hydrogen peroxide per mole of tungsten.

To convert the peroxypolytungstate solution to the stable oxide polytungstate solution, the process preferably includes the steps of (i) drying the peroxypolytungstate solution to form a powder; (ii) dissolving or dispersing the powder in a solvent that includes an alcohol (e.g., ethanol) to form an alcoholic solution; and (iii) heating the alcoholic solution (e.g., at its boiling point) to convert the peroxypolytungstate solution to the stable oxide polytungstate solution.

The stable oxide polytungstate solution preferably is substantially free of peroxide species (e.g., tungstate ions, clusters, polymers, and/or colloids containing peroxide chemical bonds) and peroxytungstic acid. Moreover, the stable oxide polytungstate solution preferably includes no greater than about 50% by weight water, more preferably no greater than 20% by weight water, and even more preferably no greater than about 8% by weight water. Even more preferred are stable oxide polytungstate solutions that are substantially free of water.

The invention also features a process for producing tungsten oxide by transforming the above-described stable oxide polytungstate solution to tungsten oxide. The transformation is preferably effected by drying the stable oxide polytungstate solution to form a residue, and then heating the residue at a temperature ranging from about 100° C. to about 350° C., and more preferably from about 150° C. to about 250° C.

In a second aspect, the invention features a process for producing a tungsten oxide precursor solution that includes converting an acidified ammonium metatungstate solution to a stable oxide polytungstate solution, e.g., by exposing the acidified ammonium metatungstate solution to a peroxide to form a peroxypolytungstate solution, and then converting the peroxypolytungstate solution to the stable oxide polytungstate solution. The stable oxide polytungstate solution can then be transformed to tungsten oxide.

Throughout this application the following definitions apply:

"Tungsten oxide precursor solution" refers to a sol or solution that can be transformed to tungsten oxide.

"Polytungstate solution" refers to an essentially clear or slightly translucent sol or solution that includes tungstate ions, polymers, and/or colloidal particles.

"Peroxypolytungstate solution" refers to an essentially clear or slightly translucent sol or solution that includes tungstate ions, polymers, and/or colloidal particles, and is further characterized by the presence of peroxy chemical bonds as manifested, e.g., in a tungsten-peroxy peak appearing at about 550–570 $cm^{-1}$ in a Raman spectrum of the corresponding dried solid.

"Acidified ammonium metatungstate solution" refers to a polytungstate solution prepared by acidifying an ammonium metatungstate solution that includes species having the nominal formula $(NH_4)_6H_2W_{12}O_{40}+XH_2O$.

"Stable oxide polytungstate solution" refers to a solution or sol formed from a peroxypolytungstate species in which at least a substantial number of the peroxide bonds have been converted to oxide bonds. The conversion is manifested, e.g., as a decrease in the tungsten-peroxy peak appearing at about 550–570 $cm^{-1}$ in a Raman spectrum of the dried solid corresponding to the initial peroxypolytungstate and the appearance of a broad peak at 700–800 $cm^{-1}$ (corresponding to the dried solid form of the oxide polytungstate). Typically, a reduction of at least about 50% in the area of the tungsten-peroxy peak is desirable.

The conversion is generally accompanied by changes in the polytungstate species, e.g., growth of the species. It is believed that these changes enable subsequent transformation of the oxide polytungstate to a tungsten oxide composition particularly suitable for electrochromic devices. Although the specific properties of any single tungsten oxide composition may depend on the particular reaction conditions (e.g., temperature) used, tungsten oxide compositions prepared according to the invention generally are reversible with respect to lithium intercalation when fired at 150° C.–250° C. In addition, when placed in a colored state through lithium ion intercalation and then bleached by de-intercalation, the compositions return substantially to their original uncolored state.

The oxide polytungstate solution is "stable" in the sense that it exhibits negligible changes in viscosity, appearance, and properties over time scales typically encountered for storing solutions for subsequent coating (e.g., on the order of several days to several months) under typical storage conditions.

The invention provides a reliable, reproducible method for producing electrochromic tungsten oxide. The method uses inexpensive and readily available starting materials, and can be performed in a few hours. The method does not produce corrosive by-products and results in stable, ion-intercalating tungsten oxide materials suitable for use in electrochromic devices.

Other features and advantages of the invention will be apparent from the following description of the preferred embodiments thereof, and from the claims.

DESCRIPTION OF THE PREFERRED EMBODIMENTS

The invention features a process in which a tungsten oxide precursor solution is transformed to tungsten oxide (e.g., in the form of a coating on a substrate such as glass or plastic). The precursor solution is preferably prepared by treating an initial polytungstate solution with a peroxide to form a peroxypolytungstate solution, followed by converting the peroxypolytungstate solution to a stable oxide polytungstate solution. The initial polytungstate solution is preferably in the form of an aqueous solution, and may be prepared according to a variety of methods, including acidification of soluble tungstate salts (e.g., $Na_2WO_4$) or hydrolysis of tungsten alkoxides.

A particularly preferred initial polytungstate solution is an aqueous solution of acidified ammonium metatungstate ("AMT"). AMT solutions are clear, colorless, and resist forming coagulated gels. They may be prepared at ambient temperature by eluting an aqueous ammonium metatungstate solution (containing, e.g., about 20 g of ammonium metatungstate per 100 g of distilled, de-ionized water) through an acidified cation exchange column or by mixing the metatungstate solution with the acidified cation exchange resin, followed by removing the resin by filtering, decanting, or a comparable method. Other acidification methods (e.g., dropwise addition of an acid such as HCl, followed by dialysis) may be used as well. The cation exchange column offers the advantage of removing unwanted cations without the need for further purification. Examples of suitable acidified cation exchange media are commercially available and include Amberlite IR 120+ acidic ion exchange resin from Aldrich Chemical Co. of Milwaukee, Wis. The acidification reaction is preferably conducted such that the product solution has a pH no greater than about 2.0.

The initial polytungstate solution is preferably stable over the time scale generally encountered in preparing the tungsten oxide precursor solution (e.g., on the order of several hours to several days) in the sense that it exhibits negligible changes in viscosity, appearance, and properties over this time period. The initial polytungstate solution also preferably has the ability to be dried to a powder and then dissolved in aqueous or polar organic solvents (e.g., alcohols) to form an optically clear, substantially gel-free solution.

The next step is to treat the initial polytungstate solution with a peroxide to form a peroxypolytungstate solution. Typically, this is accomplished by adding a peroxide solution to the polytungstate solution with stirring for a period of about 20 minutes.

The preferred peroxide is hydrogen peroxide. The amount of peroxide is selected to form a peroxypolytungstate which can be dried without substantial gelation, easily re-dispersed or re-dissolved following drying, and readily converted in solution to a stable oxide polytungstate solution. In the case of hydrogen peroxide and AMT-based initial polytungstate solutions, the amount of peroxide typically ranges from about 0.2 to about 2 moles of hydrogen peroxide per mole of tungsten, and more preferably from about 0.7 to about 1.3 moles.

In cases where the initial polytungstate solution is not AMT, but rather the product of, e.g., acidification of an alkali tungstate such as $Na_2WO_4$, particular care must be taken prior to and during the peroxide treatment to avoid formation of intractable gels or coagulated solids. This may be accomplished, e.g., by using a dilute tungstate salt solution and collecting the acidified product directly into the peroxide solution. In addition, the amount of peroxide may have to be adjusted to ensure formation of a peroxy product that will dissolve.

An alternate (albeit less preferred) method for forming the peroxypolytungstate solution involves digesting tungsten metal or tungsten carbide in aqueous or alcoholic peroxide solutions to form a peroxytungstic acid solution.

The peroxypolytungstate solution is converted to a stable oxide polytungstate solution. One way of accomplishing the conversion is to age the peroxypolytungstate solution for an extended period of time (e.g., on the order of months). Preferably, however, conversion is accomplished by drying the peroxypolytungstate solution to form a powder, dissolving the powder in an alcohol (preferably ethanol), and then refluxing the resulting solution at or near its boiling point. Drying is typically accomplished by evaporating solvent (typically water) at slightly elevated temperatures (e.g., about 40° C.). A rotary evaporator may be used for the drying step, although other drying methods such as spray drying may be used as well. Dissolution in alcohol is preferably effected by adding the alcoholic solvent to the dried powder, heating the resulting mixture to about 30–60° C. (e.g., in the case where the alcohol is ethanol), and stirring the mixture until a clear solution is obtained. Concentrations convenient for subsequent coating formation (e.g., about 10–20% by weight tungsten oxide) are generally used.

The reflux period must be sufficiently long to produce the desired oxide polytungstate solution without concurrent formation of substantial amounts of haze, precipitation, viscosity increase, or gelation, which may occur if the reflux period is too long. On the other hand, if the reflux period is too short, inadequate conversion to the oxide polytungstate may occur, resulting ultimately in tungsten oxide coatings that do not fully bleach upon de-intercalation of lithium ions.

Typical reflux periods are on the order of about 60 minutes. For example, in the case of peroxypolytungstate solutions prepared from AMT containing about 0.7 to about 1.3 moles of peroxide per mole of tungsten oxide which have been dried and re-dissolved in ethanol at a concentration of about 17% by weight tungsten oxide, reflux periods ranging from about 40–60 minutes have been found to produce satisfactory oxide polytungstate solutions.

Incorporating small amounts of water into the alcohol solution prior to refluxing may provide additional flexibility in the reflux period. For example, in the case of peroxypolytungstate solutions prepared from AMT, incorporation of small amounts of water may increase the reflux "window" to two hours or more. Large amounts of water, however, are preferably avoided because they may result in optical defects and/or inadequate conversion, resulting ultimately in tungsten oxide coatings that do not fully bleach upon de-intercalation of lithium ions. In general, the amount of water is no greater than about 20% by weight (which translates to about 15 moles of water per mole of tungsten for a peroxypolytungstate solution having 17% by weight tungsten oxide). Preferably, the amount of water ranges from about 2 to about 8% by weight.

The resulting oxide polytungstate solutions are stable, as defined above. For example, the above-described solution prepared from AMT is stable for periods up to 50 days at room temperature, and for at least several months when refrigerated at a temperature of about 5–10° C. Stability may be enhanced further through incorporation of additives such as 2,4-pentanedione.

The solution may further include other additives as well. For example, the solution may include inorganic additives such as $TiO_2$ that affect the structure and properties of the final tungsten oxide coating.

Other additives which may be included are fugitive organic materials that may affect solution stability or oxide microstructure.

To transform the stable oxide polytungstate solution to a tungsten oxide coating, the solution is preferably applied to the surface of a substrate (e.g., a glass or plastic substrate provided with a transparent conductor), dried to solid form, and then heated to remove any remaining solvent and transform the oxide polytungstate to tungsten oxide. Suitable application methods include dipping the substrate into the solution or spreading the solution onto the substrate surface. Heating is preferably conducted at temperatures ranging from about 100° C. to about 350° C. (more preferably from about 150° C. to about 250° C.) for a period of time ranging from about 1–40 minutes (more preferably from about 5–20 minutes).

The invention will now be described further by way of the following examples.

EXAMPLES

Example 1

This example describes the preparation of tungsten oxide coatings.

About 20 g of 99.9%+ ammonium metatungstate powder (Pfaltz & Bauer, Waterbury, Conn.) was dissolved in about 100 g of distilled, deionized water. A cylindrical, gravity-fed ion exchange column (60 cm long with a 4 cm inner diameter) was filled with 90 cm$^3$ of AMBERLITE IR 120+ acidic ion exchange resin (Aldrich Chemical, Milwaukee, Wis.). The aqueous ammonium metatungstate solution was then added to the column, and drained through the column at a rate of about 50–70 cm$^3$ per minute. When the pH of the effluent rapidly changed from neutral to highly acidic (i.e., having a pH<2), collection began. The total amount of material collected was about 130 mLs.

Next, about 10 g of 30% hydrogen peroxide (Mallinckrodt Chemical Co., Paris, Ky.) was added to the acidified ammonium metatungstate solution collected from the ion exchange column, and the resulting solution stirred for 30 minutes. The solution was then dried on a rotary evaporator at 40° C. to a non-tacky solid in about 45 minutes. About 90 mL of absolute ethanol was added to the dried powder, after which the mixture was stirred at about 60° C. for about 1 hour until the powder had dissolved. About 5 mL of distilled, de-ionized water was then added to the ethanol solution, followed by refluxing at the boiling point (about 77° C.) for about 90 minutes. The resulting stable oxide polytungstate solution contained about 17% by weight tungsten oxide and had a room temperature viscosity of about 2.5 centistokes.

ITO-coated glass plates (Libbey-Owens-Ford, Toledo, Ohio) were dipped into a beaker containing the stable oxide polytungstate solution and withdrawn at a rate of about 20 cm per minutes. The coated samples were then air-dried, after which they were heat-treated at about 225° C. for about 20 minutes in a box furnace to form an electrochromic tungsten oxide coating. Based upon the weight gain of a sample having a known surface area, the average coating thickness was calculated to be approximately 3000 angstroms, assuming a density of about 5.0 g/cm$^3$ for the amorphous tungsten oxide coating.

The samples were tested using an electrochemical test apparatus consisting of a scanning potentiostat (Model 100B, available from Bioanalytical Systems, West Lafayette, Ind. or Model 362, available from EG&G PARC, Princeton, N.J.), a three electrode cell containing the test electrode, a Ag/AgCl$_2$ reference electrode, and a Pt auxiliary electrode, and a test solution of 0.1N CF$_3$SO$_3$Li (available as FC-122 from 3M, St. Paul, Minn.) or lithium trifluoromethanesulfonylimide (available as HG-115 from 3M, St. Paul, Minn.) in acetonitrile. Charging and discharging were done at −1.0 and +1.0 volts, respectively. Charge uptake and discharge were measured using a coulombmeter, and optical properties were measured using an integrated optical densitometer featuring a quartz halogen lamp Type 2604-A equipped with a blue filter (Photographic Type 80-A) as a light source that corrects temperature to approximate day light. The detector was a crystalline silicon photodiode. As deposited, uncharged samples exhibited an average integrated transmission of about 79–81%. Highly charged samples (e.g., samples charged at −1.0V until the charging current fell to about 1 mA per 20 cm$^3$) had charges of 20–30 mC per cm$^2$ and exhibited an average integrated transmission of about 14–20%. After bleaching at +1.0V, the average integrated optical transmission was again about 79–81%.

Example 2

Tungsten oxide-coated samples were prepared according to the procedure of Example 1, but with the following changes. About 24.2 g of sodium tungstate (Na$_2$WO$_4$+ 2H$_2$O) was used instead of ammonium metatungstate and combined with 150 g of distilled, de-ionized water. A larger ion exchange column provided with 450 cm$^3$ of ion exchange resin was used for the acidification step. The acidified solution was collected directly into a beaker containing about 10 g of 30% hydrogen peroxide solution.

The coated glass samples were heated at 175° C. for 15 minutes. The average initial integrated transmission, charged transmission, and discharged transmission values were about 80–81%, 18–28%, and 79–81%, respectively.

Example 3

A peroxytungstic acid solution was prepared by adding 8 g of tungsten metal powder (Alfa Chemicals, −22 mesh, 99.999%) to a mixture of about 50 g of distilled, de-ionized water and 50 g of 30% aqueous hydrogen peroxide. The powder was added slowly with stirring over a period of about 1 hour, after which the reaction was continued for about 24 hours and filtered to yield a clear solution containing the peroxytungstic acid. A platinum mesh was immersed in the solution for several minutes to decompose any unreacted hydrogen peroxide.

The solution was filtered through fast filter paper (Whatman #5) and then further processed according to the procedure described in Example 1 to form a stable oxide polytungstate solution, with the exception that several hours were required for re-dissolution in ethanol. Tungsten oxide-coated glass samples were prepared and tested according to the procedure described in Example 2. The initial, charged, and discharged integrated transmission values were 81%, 21%, and 79%, respectively.

Other embodiments are within the following claims.

What is claimed is:

1. A process for producing a tungsten oxide solution comprising the steps of providing a peroxypolytungstate solution and converting at least a substantial number of peroxide bonds to oxide bonds by heating or aging said peroxypolytungstate solution so to form a stable oxide polytungstate solution.

2. A process according to claim 1 comprising treating a polytungstate solution with a peroxide to form said peroxypolytungstate solution.

3. A process according to claim 1 comprising forming a peroxypolytungstate solution comprising the steps of acidifying a solution of ammonium metatungstate and treating said solution with a peroxide.

4. A process according to claim 2 comprising treating said polytungstate solution with a peroxide comprising hydrogen peroxide.

5. A process according to claim 2 comprising treating said polytungstate solution with a peroxide comprising from about 0.2 to about 2.0 moles of hydrogen peroxide per mole of tungsten.

6. A process according to claim 2 comprising treating said polytungstate solution with a peroxide comprising from about 0.7 to about 1.3 moles of hydrogen peroxide per mole of tungsten.

7. A process according to claim 1 wherein said stable oxide polytungstate solution is substantially free of peroxide species.

8. A process according to claim 1 wherein said stable oxide polytungstate solution is substantially free of peroxytungstic acid.

9. A process according to claim 1 wherein said stable oxide polytungstate solution comprises no greater than about 50% by weight water.

10. A process according to claim 1 wherein said stable oxide polytungstate solution comprises no greater than about 20% by weight water.

11. A process according to claim 1 wherein said stable oxide polytungstate solution comprises no greater than about 8% by weight water.

12. A process according to claim 1 wherein said stable oxide polytungstate solution is substantially free of water.

13. A process for producing tungsten oxide comprising the steps of (a) providing a peroxypolytungstate solution; (b) converting a substantial number of peroxide bonds to oxide bonds by heating or aging said peroxypolytungstate solution so to form a stable oxide polytungstate solution; and (c) transforming said stable oxide polytungstate solution to tungsten oxide.

14. A process according to claim 13 comprising treating a polytungstate solution with a peroxide to form said peroxypolytungstate solution.

15. A process according to claim 13 comprising forming a peroxypolytungstate solution comprising the steps of acidifying a solution of ammonium metatungstate and treating said solution with a peroxide.

16. A process according to claim 14 comprising treating said polytungstate solution with a peroxide comprising hydrogen peroxide.

17. A process according to claim 14 comprising treating said polytungstate solution with a peroxide comprising from about 0.2 to about 2.0 moles of hydrogen peroxide per mole of tungsten.

18. A process according to claim 14 comprising treating said polytungstate solution with a peroxide comprising from about 0.7 to about 1.3 moles of hydrogen peroxide per mole of tungsten.

19. A process according to claim 13 wherein said stable oxide polytungstate solution is substantially free of peroxide species.

20. A process according to claim 13 wherein said stable oxide polytungstate solution is substantially free of peroxytungstic acid.

21. A process according to claim 13 wherein said stable oxide polytungstate solution comprises no greater than about 50% by weight water.

22. A process according to claim 13 wherein said stable oxide polytungstate solution comprises no greater than about 20% by weight water.

23. A process according to claim 13 wherein said stable oxide polytungstate solution comprises no greater than about 8% by weight water.

24. A process according to claim 13 wherein said stable oxide polytungstate solution is substantially free of water.

25. A process according to claim 13 comprising drying said stable oxide polytungstate solution to form a residue and heating said residue at a temperature ranging from about 100° C. to about 350V C. to form tungsten oxide.

26. A process according to claim 13 comprising drying said oxide polytungstate solution to form a residue and heating said residue at a temperature ranging from about 150° C. to about 250° C. to form tungsten oxide.

27. A process for producing a tungsten oxide precursor solution comprising converting an acidified ammonium metatungstate solution to a stable oxide polytungstate solution.

28. A process according to claim 27 comprising treating said acidified ammonium metatungstate solution with peroxide to form a peroxypolytungstate solution and converting said peroxypolytungstate solution to said stable oxide polytungstate solution.

29. A process for producing a tungsten oxide coating comprising the steps of:

(a) providing a peroxypolytungstate solution;

(b) forming a stable oxide polytungstate solution by heating or aging said peroxypolytungstate solution so to convert a substantial number of peroxide bonds to oxide bonds;

(c) applying the stable oxide polytungstate solution to a substrate; and (d) transforming said stable oxide polytungstate solution to tungsten oxide.

30. A process for forming a tungsten oxide coated substrate comprising the steps of:

(a) providing a substrate;

(b) providing a peroxypolytungstate solution;

(c) forming a stable oxide polytungstate solution by heating or aging said peroxypolytungstate solution so to convert a substantial number of peroxide bonds to oxide bonds;

(d) applying the stable oxide polytungstate solution to a substrate; and (e) transforming said stable oxide polytungstate solution to tungsten oxide.

31. The process according to claim 3 wherein the ammonium metatungstate solution is acidified by contacting said solution with acidified cation exchange resin.

32. The process according to claim 3 wherein the ammonium metatungstate solution is acidified by addition of an acid followed by dialysis.

33. The process according to claim 15 wherein the ammonium metatungstate solution is acidified by contacting said solution with acidified cation exchange resin.

34. The process according to claim 15 wherein the ammonium metatungstate solution is acidified by addition of an acid followed by dialysis.

* * * * *